US012131364B2

(12) United States Patent
Agrawal et al.

(10) Patent No.: US 12,131,364 B2
(45) Date of Patent: Oct. 29, 2024

(54) SYSTEMS AND METHODS FOR PROVIDING INTELLIGENT MULTI-DIMENSIONAL RECOMMENDATIONS DURING ONLINE SHOPPING

(71) Applicant: Coupang, Corp., Seoul (KR)

(72) Inventors: Nishant Agrawal, Seattle, WA (US); Pankesh Bamotra, Seattle, WA (US); Emily Hua, Mountain View, CA (US); Ashutosh Pendse, Mountain View, CA (US); Sungho Kim, Seoul (KR); Chan Seo, Seoul (KR); Min Hyun Park, Mountain View, CA (US)

(73) Assignee: Coupang Corp., Seoul (KR)

(*) Notice: Subject to any disclaimer, the term of this patent is extended or adjusted under 35 U.S.C. 154(b) by 0 days.

(21) Appl. No.: 17/030,282

(22) Filed: Sep. 23, 2020

(65) Prior Publication Data

US 2022/0092666 A1 Mar. 24, 2022

(51) Int. Cl.
*G06Q 30/00* (2023.01)
*G06F 16/2457* (2019.01)
*G06Q 30/0601* (2023.01)

(52) U.S. Cl.
CPC ... *G06Q 30/0625* (2013.01); *G06F 16/24578* (2019.01); *G06Q 30/0631* (2013.01); *G06Q 30/0641* (2013.01)

(58) Field of Classification Search
CPC ............ G06Q 30/0601–0645; G06F 16/24578
(Continued)

(56) References Cited

U.S. PATENT DOCUMENTS 7,765,227 B1 7/2010 Khoshnevisan et al.
9,830,633 B2 11/2017 Chetuparambil et al.
(Continued)

FOREIGN PATENT DOCUMENTS

TW 201131498 A1 9/2011
TW 201706928 A 2/2017
(Continued)

OTHER PUBLICATIONS

Choochaiwattana, W. (2009). Using social annotations to improve web search (Order No. 3384939). Available from ProQuest Dissertations & Theses Global. (304985358). Retrieved from https://www.proquest.com/dissertations-theses/using-social-annotations-improve-web-search/docview/304985358/se-2 (Year: 2009).*

(Continued)

*Primary Examiner* — Arielle E Weiner
(74) *Attorney, Agent, or Firm* — FINNEGAN, HENDERSON, FARABOW, GARRETT & DUNNER, LLP

(57) ABSTRACT

One aspect of the present disclosure is directed to a computer-implemented system for streamlined product searching configured to receive a search query comprising at least one keyword; determine a product type; retrieve a first record of products associated with the product type; determine whether the search query meets a condition; and if the search query meets the condition: determine, a plurality of label values, and for each label value: generate a second record of products associated with the label value; determine whether each product in the second record meets a condition; deleting each product that meets the condition from the second record; ranking each remaining product in each second record; display the plurality of label values for selection; receive a selected label value; and display at least
(Continued)

a portion of the remaining ranked products associated with the selected label value.

16 Claims, 10 Drawing Sheets

(58) Field of Classification Search
USPC .................................................. 705/26.62
See application file for complete search history.

(56) References Cited

U.S. PATENT DOCUMENTS

| | | | |
|---|---|---|---|
| 10,410,224 B1* | 9/2019 | Levanon | G06Q 30/02 |
| 10,417,220 B1* | 9/2019 | Khafizov | G06F 16/951 |
| 11,036,801 B1* | 6/2021 | Boteanu | G06F 16/90324 |
| 11,238,516 B1* | 2/2022 | McAllister | G06F 16/24578 |
| 2014/0289210 A1* | 9/2014 | Taank | G06F 16/951 |
| | | | 707/706 |
| 2014/0298184 A1 | 10/2014 | Bailin | |
| 2014/0351052 A1 | 11/2014 | Khalsa et al. | |
| 2015/0161200 A1* | 6/2015 | Barba | G06F 16/24 |
| | | | 705/313 |
| 2015/0278902 A1* | 10/2015 | Warren | G06Q 30/0623 |
| | | | 705/26.61 |
| 2015/0310527 A1* | 10/2015 | Warren | G06Q 30/0623 |
| | | | 705/26.62 |
| 2015/0379554 A1* | 12/2015 | Copeland | G06Q 30/0239 |
| | | | 705/14.39 |
| 2016/0112394 A1* | 4/2016 | Sahu | H04L 63/102 |
| | | | 726/7 |
| 2017/0011121 A1 | 1/2017 | Martin | |
| 2017/0046764 A1 | 2/2017 | Konik et al. | |
| 2017/0061015 A1* | 3/2017 | Gungor | G06F 16/24578 |
| 2017/0061528 A1* | 3/2017 | Arora | G06F 16/951 |
| 2017/0322971 A1 | 11/2017 | Seshadri et al. | |
| 2018/0108066 A1 | 4/2018 | Kale et al. | |
| 2019/0205761 A1* | 7/2019 | Wu | G06N 3/04 |
| 2019/0318407 A1 | 10/2019 | Giridhari et al. | |

FOREIGN PATENT DOCUMENTS

| | | |
|---|---|---|
| TW | 202006635 A | 2/2020 |
| WO | WO 2018/030350 A1 | 2/2018 |

OTHER PUBLICATIONS

International Search Report and Written Opinion mailed Jun. 17, 2021, by the Korean Intellectual Property Office in counterpart International Application No. PCT/IB2020/059204 (10 pages).
Notice of Preliminary Rejection mailed Oct. 12, 2021, by the Korean Patent Office in counterpart Korean Application No. 10-2021-7018730, 8 pages.
Office Action mailed Jan. 25, 2022, by the Taiwanese Patent Office in counterpart Taiwanese Application No. 110114557, 9 pages.
Examination Notice mailed May 30, 2022, by the Hong Kong Patent Office in counterpart Hong Kong Application No. 22021031635.6, 12 pages.
Extended European Search Report mailed Sep. 19, 2022, by the European Patent Office in counterpart European Application No. 20827971.1, 7 pages.
Further Examination Notice mailed Sep. 28, 2023, by the Hong Kong Patent Office in counterpart Hong Kong Application No. 22021031635.6, 12 pages.
Notice of Allowance mailed Feb. 22, 2024, by the Korean Patent Office in counterpart Korean Application No. 10-2022-7025505, 5 pages.
Notice of Preliminary Rejection mailed Nov. 20, 2023, by the Korean Patent Office in counterpart Korean Application No. 10-2022-7025505, 7 pages.

* cited by examiner

FIG. 1C

SYSTEMS AND METHODS FOR PROVIDING INTELLIGENT MULTI-DIMENSIONAL RECOMMENDATIONS DURING ONLINE SHOPPING

TECHNICAL FIELD

The present disclosure generally relates to computerized systems and methods for streamlined product searching. In particular, embodiments of the present disclosure relate to inventive and unconventional systems for providing intelligent multi-dimensional recommendations during online shopping.

BACKGROUND

Conventional online shopping platforms allow customers to shop for items using a searching tool to find desired products. Generally, the customer will enter a keyword into a search bar or select a category of products to begin the online shopping process. At this point, an online shopping portal may present a large quantity of related products that may be overwhelming to the customer. Often times, online shopping portals employ the option to filter search results by certain attributes, such as price, brand, sizes, product types, product subtypes, and other specifications in order to narrow search results.

In addition to generating a large amount of search results, broad search queries (e.g., 'laptop', 'tv', etc.) may result in displaying a large amount of attribute filters that the customer may choose from, which may also be overwhelming. However, even after applying these filters, customers often struggle to identify noteworthy products. This is largely due to the overwhelming amount of search results and the inability of conventional systems to effectively identify and provide product recommendation based on a search query. As a result, customers may resort to external sources, such as blogs, product reviews, or consult other external websites to determine the best product to purchase. This may result in considerable delay in the shopping process for the customer, and may also result in lost business for the online shopping platform should the customer decide to purchase from another seller during their external product research.

Therefore, there is a need for improved methods and systems for identifying and notable products and providing effective and helpful product recommendations in response to a search query in order to streamline the online shopping process.

SUMMARY

One aspect of the present disclosure is directed to a computer-implemented system for streamlined product searching. The system may include: a memory storing instructions; and at least one processor configured to execute the instructions to: receive, from a user device, a search query comprising at least one keyword; determine, based on the at least on keyword, a product type; retrieve, from at least one data structure, a first record comprising products associated with the product type and associated metadata; determine, based on the first record, whether the search query meets a first condition; and if the search query meets the first condition: determine, based on the associated metadata, a plurality of label values, and for each label value in the plurality of label values: generate, from the first record, a second record comprising products associated with the label value based on the associated metadata; determine, based on the associated metadata, whether each product in the second record meets a second condition; delete each product that meets the second condition from the second record; rank, based on the metadata, each remaining product in each second record of products; display, on the user device, the plurality of label values for selection; receive, from the user device, a selected label value; and display, on the at least one user device, at least a portion of the remaining ranked products associated with the selected label value.

Another aspect of the present disclosure is directed to a computer-implemented method for streamlined product searching. The method may include: receiving, from a user device, a search query comprising at least one keyword; determining, based on the at least on keyword, a product type; retrieving, from at least one data structure, a first record comprising products associated with the product type and associated metadata; determining, based on the first record, whether the search query meets a first condition; and if the search query meets the first condition: determining, based on the associated metadata, a plurality of label values, and for each label value in the plurality of label values: generating, from the first record, a second record comprising products associated with the label value based on the associated metadata; determining, based on the associated metadata, whether each product in the second record meets a second condition; deleting each product that meets the second condition from the second record; ranking, based on the metadata, each remaining product in each second record of products; displaying, on the user device, the plurality of label values for selection; receiving, from the user device, a selected label value; and displaying, on the at least one user device, at least a portion of the remaining ranked products associated with the selected label value.

Yet another aspect of the present disclosure is directed to a computer-implemented system for streamlined product searching. The system may include: a memory storing instructions; and at least one processor configured to execute the instructions to: receive, from a user device, a search query comprising at least one keyword; determine, based on the at least on keyword, a product type; retrieve, from at least one data structure, a first record of product listings associated with the product type, each product listing comprising: a product; attributes associated with the product; and historical engagement data; determine, based on a number of product listings in the first record, whether the search query meets a first condition; and if the search query meets the first condition: determine, for each product in the first record, at least one correlation value associated with at least one of the product, historical engagement data, and the attributes associated with the product; determining, based on the at least one correlation value, a plurality of dimensions, and for each dimension in the plurality of dimensions: generate, from the first record, a second record comprising products associated with the dimension; determine, for each product listing in the second record; whether the product listing meets a second condition based on at least one of the product, the attributes associated with each product, and the historical engagement data; delete each product listing that meets the second condition from the second record; rank, based on at least one of the product, the attributes associated with each product, and the historical engagement data of each remaining product listing in each second record; display, on the user device, the plurality of dimensions for selection; receive, from the user device, a selected dimension; and display, on the at least one user device, at least a portion of the remaining ranked product listings associated with the selected dimension.

Other systems, methods, and computer-readable media are also discussed herein.

BRIEF DESCRIPTION OF THE DRAWINGS

Figure 1C:
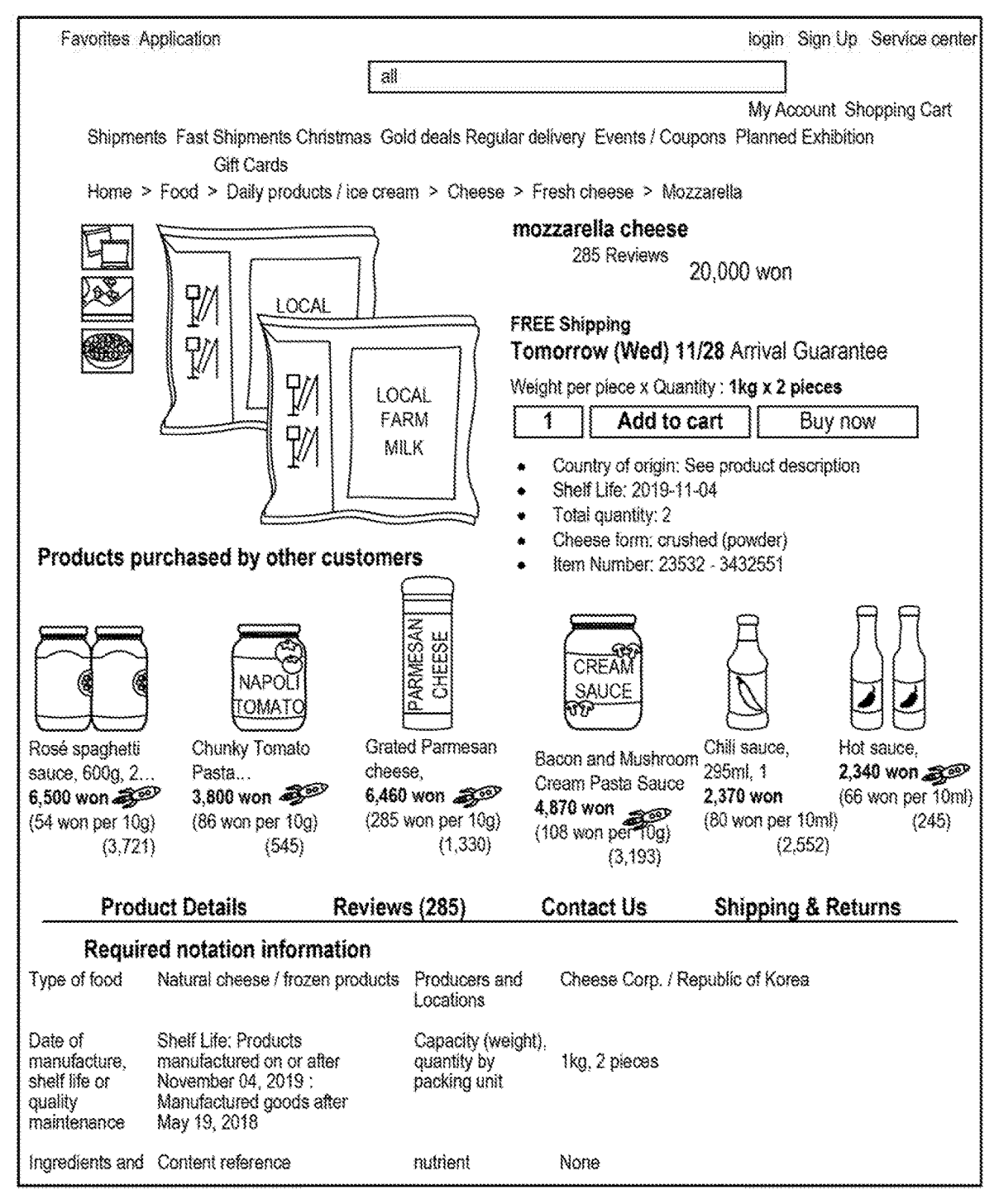

FIG. 1C depicts a sample Single Detail Page (SDP) that includes a product and information about the product along with interactive user interface elements, consistent with the disclosed embodiments.

DETAILED DESCRIPTION

Figure 1A:
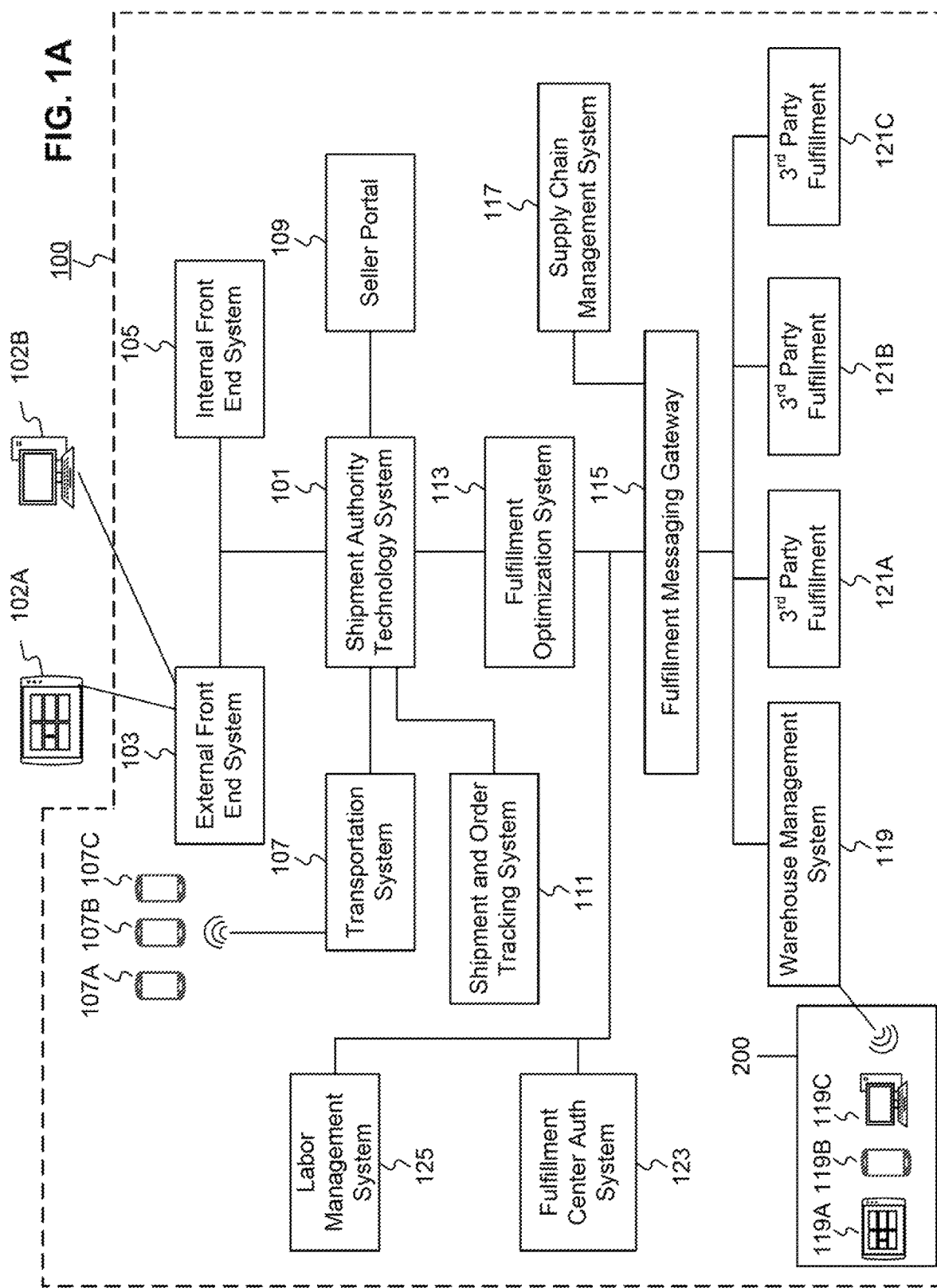
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for providing visual navigation during online shopping using intelligent filter sequencing.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
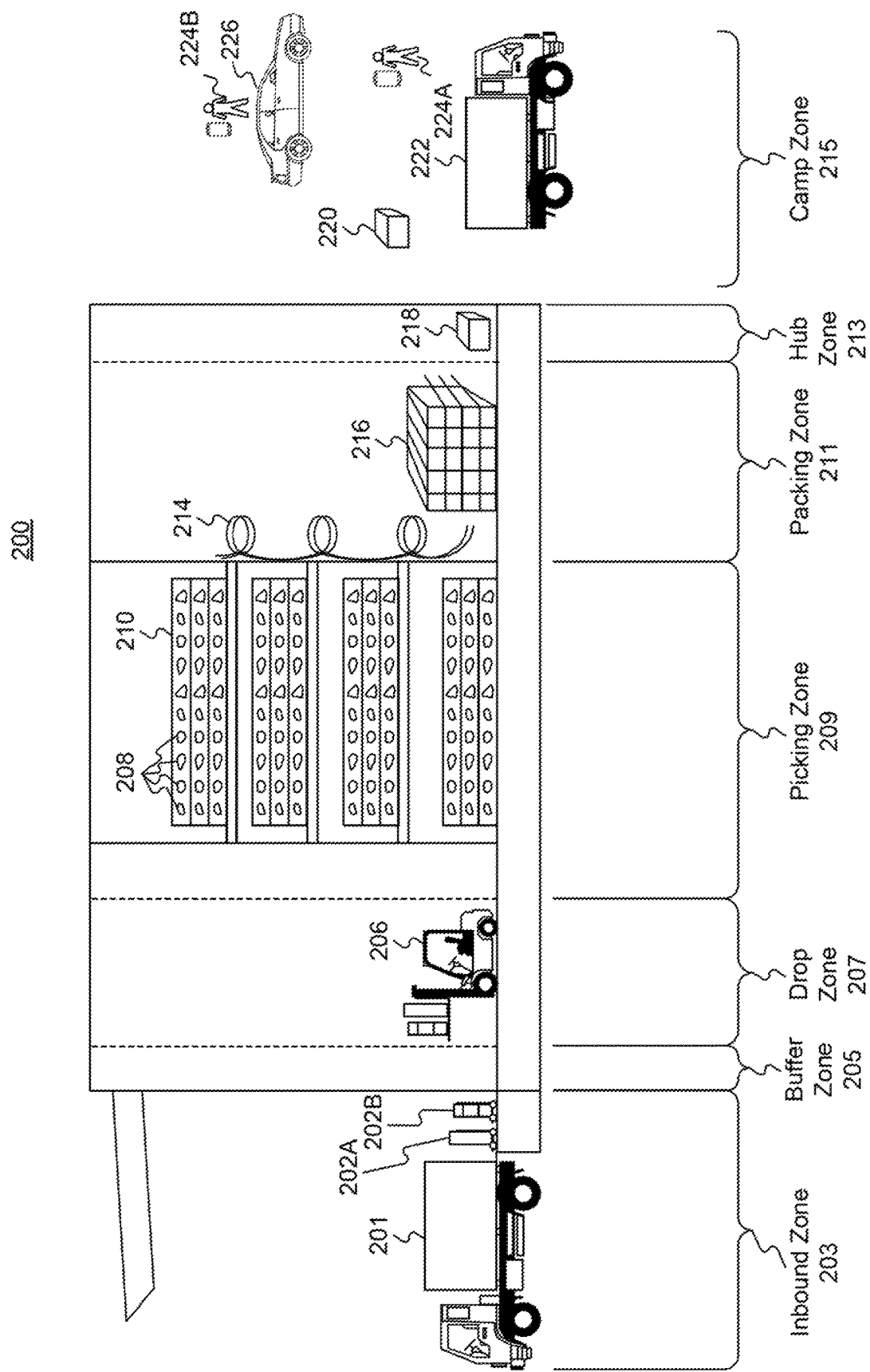
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
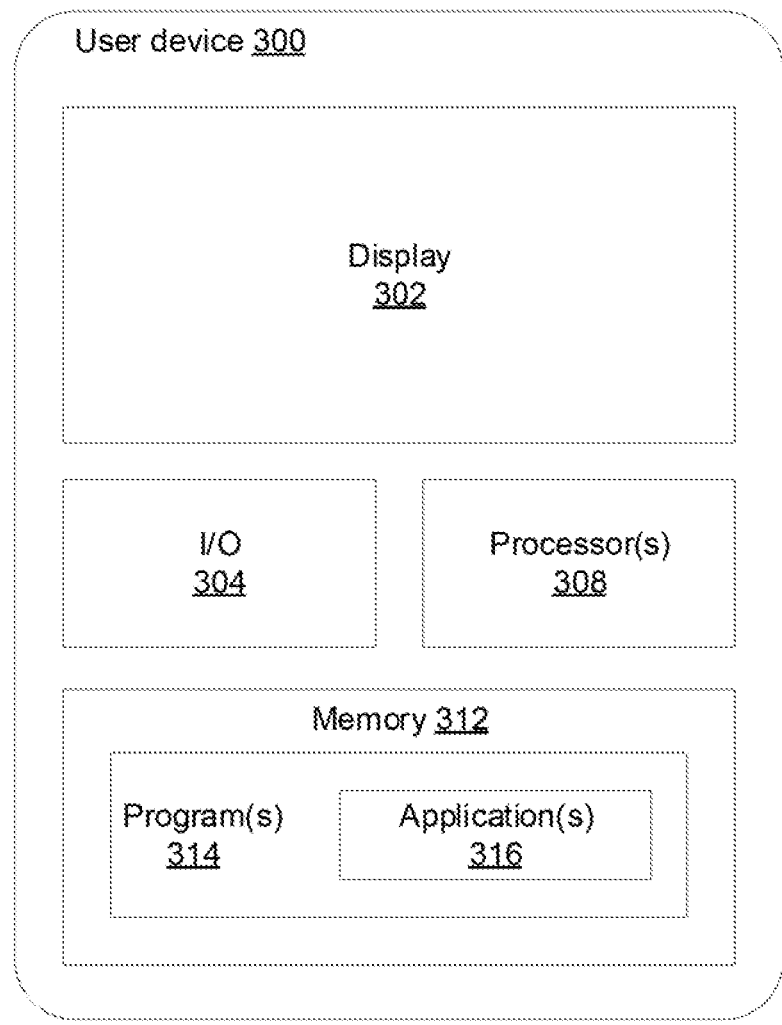
FIG. 3 is a block diagram of an exemplary user device, consistent with disclosed embodiments.

FIG. 3 shows an exemplary configuration of user device 300, consistent with disclosed embodiments. User device 300 of FIG. 3 represents an exemplary configuration of user devices (e.g., mobile device 102A or computer 102B) that may be used by a customer to access external front end system 103. For example, user device 300 may enable associated customers to perform remote interactions or mobile transactions with external front end system 103 or receive information from external front end system 103. In some embodiments, user device 300 may be a personal computing device. For example, user device 300 may be a smartphone, a laptop or notebook computer, a tablet, a multifunctional watch, a pair of multifunctional glasses, or any mobile or wearable device with computing ability, or any other device or combination of devices suitable for accessing external front end system 103.

User device 300 may include one or more processors 308 configured to execute software instructions stored in memory, such as a memory 312. Processor 308 may include one or more known processing devices, such as a microprocessor from the Pentium™ or Xeon™ family manufactured by Intel™, or the Turion™ family manufactured by AMD™, for example. The disclosed embodiments are not limited to any type of processor(s) otherwise configured to meet the computing demands required of different components of system 100. Memory 312 may store one or more software programs 314 that when executed by processor 308 perform known Internet-related communication, content display processes, and other interactive processes for customers. For instance, user device 300 may execute a browser or related mobile display software that generates and displays interfaces including content on a display device 302 included in, or in communication with, user device 300. User device 300 may be a mobile device that executes mobile device applications and/or mobile device communication software, included in programs 314, that allows user device 300 to communicate with interconnection service device 116 and other components via communication network 114, to generate and display content in interfaces via display device 302. The disclosed embodiments are not limited to any particular configuration of user device 300. User device 300 may include any arrangement of one or more computing devices configured to perform one or more operations consistent with disclosed embodiments.

User device 300 may be configured to store, in memory 312, one or more operating systems that perform known operating system functions when executed by processor 308. By way of example, the operating systems may include Microsoft Windows™, Unix™ Linux™ Android™, Apple™ Mac OS operating systems, iOS, Chrome OS, or other types of operating systems. Accordingly, disclosed embodiments may operate and function with computer systems running any type of operating system. User device 300 may also include communication software stored in memory 312 that, when executed by processor 308, provides communications with communication network 114, such as Web browser software, tablet or smart handheld device networking software, etc.

Display device 302 may include, for example, a liquid crystal displays (LCD), a light emitting diode screens (LED), an organic light emitting diode screen (OLED), a touch screen, and other known display devices. Display device 302 may display various information to customers, drivers and merchants. For example, display device 302 may display an interactive interface enabling customers, drivers and merchants to operate user device 300 to perform certain aspects of the disclosed methods. Display device 302 may display touchable or selectable options for customers, drivers and merchants to select and may receive customer selection of options through a touch screen.

User device 300 includes I/O devices 304 that allows to send and receive information or interact with customers, drivers and merchants or another device. For example, I/O devices 304 may include various input/output devices, such as a keyboard, a mouse-type device, a gesture sensor, an action sensor, a physical button, switch, microphone, touch-screen panel, stylus, etc., that may be manipulated by customers, drivers and merchants to input information using user device 300. I/O devices 304 may also include an audio output device, such as a speaker configured to provide sound and audio feedback to customers, drivers and merchants operating user device 300. In some embodiments, I/O devices 304 may include a light emitting component, such as a LED or other component capable of providing a visible signal to customers, drivers and merchants. I/O devices 304 may also include haptic output devices, to provide haptic feedback to customers, drivers and merchants. I/O devices 304 may also include one or more communication modules (not shown) for sending and receiving information from other components in system 100 by, for example, establishing wired or wireless connectivity between user device 300 and external front end system 103. I/O devices 304 may include radio frequency, infrared, or other near-field communication interfaces, for communicating with other devices associated with communication system. Exemplary communication modules of I/O devices 304 may include, for example, a short-range or near field wireless communication modem, a Wi-Fi™ communication modem, or a cellular communication modem. I/O devices 304 may include a transceiver or transmitter configured to communicate using one or more wireless technologies/protocols that may include, without limitation, cellular (e.g., 3G, 4G, etc.) technology, Wi-Fi™ hotspot technology, RFID, near-field communication (NFC) or BLUETOOTH® technologies, etc. More generally, any uni- or bi-directional communication technology known to one of ordinary skill in the art may be implemented in user device 300 to exchange information with external front end system 103.

As described above, user device 300 may be a device that executes mobile applications for performing operations consistent with disclosed embodiments. Thus, in some embodiments, programs 314 stored on user device 300 may include one or more software applications 316 installed thereon, that enable user device 300 to communicate with external front end system 103 and perform aspects of the disclosed methods. For example, user device 300 may connect to external front end system 103 by using browser software to access and receive information or perform other operations associated with an internet service provider.

According to an exemplary embodiment, software applications 316 associated with system 100 may be installed on user device 300, as shown in FIG. 3. For example, external front end system 103 may receive a request from user device 300 to download one or more software applications 316. In one embodiment, external front end system 103 may receive the request from a customer associated with user device 300 using a web browser application installed on user device 300 respectively. In another embodiment, external front end system 103 may receive the request to download one or more software applications 316 associated with external front end system 103 onto user device 300 from a webpage or another portal associated with external front end system 103 accessed via, e.g., user device 300. In this embodiment, external front end system 103 may store software instructions corresponding to one or more software applications 316 in a remote database (not shown). For responding to the download request, external front end system 103 may receive additional information from user device 300 regarding the particular device specifications of user device 300 to enable user device 300 to download software instructions corresponding to the particular specifications. Alternatively, external front end system 103 may push a download request link to user device 300 or transmit software code corresponding to one or more software applications 316 directly to user device 300 in, for example, an e-mail, a text or short message service (SMS) message, a prompt through an app, or other suitable method. User device 300 may receive the software code related to one or more software applications 316 to download and install the software code.

Figure 4:
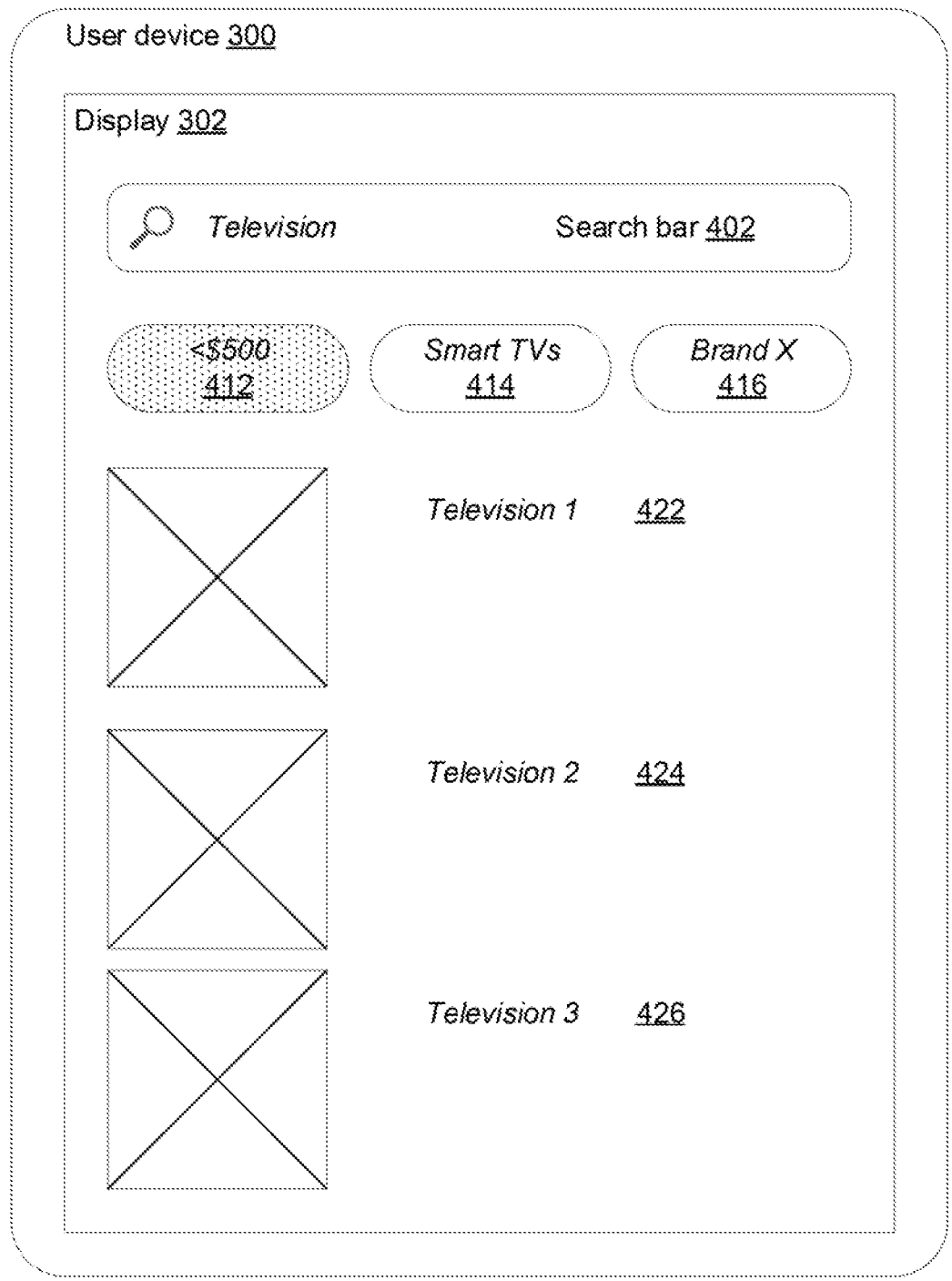
FIG. 4 depicts an exemplary product recommendation system displayed on an exemplary user device, consistent with disclosed embodiments.

FIG. 4 depicts an exemplary product recommendation system displayed on an exemplary user device, consistent with disclosed embodiments. As discussed previously, due to the large amount of search results conventionally generated in response to a search query, it may be difficult for customers to find notable products while accessing external front end system 103. Furthermore, the number of filters offered to the customer may be overwhelming, thereby reducing their engagement rate. Accordingly, in some embodiments, external front end system 103 may be configured to display, on user device 300, products associated with a limited number of label values and/or dimensions related to important product attributes to aid the customer in navigating through search results in a more efficient and accessible manner. This may be achieved, for example, by determining a plurality of label values and/or dimensions and identifying notable product listings associated with each label value and/or dimension.

In the example illustrated in FIG. 4, the user has entered the term 'television' into search bar 402. However, because 'television' is a very large query, the user would conventionally be presented with an overwhelmingly large amount of products without any context that may help the customer determine the best product to purchase. In this exemplary illustration, however, the user is presented with several label values that may help the user narrow the search. In particular, the user is presented with a first selectable label value 412 (<$500) a second selectable label value 414 (Smart TVs) and a third selectable label value 416 (Brand X), although any number of selectable label may be displayed. Upon selection of one of selectable label values 412, 414, or 416, external front end system 103 may display on user device 300 a plurality of recommended products associated with the label value. In this example, the user has selected label value 412 (<$500), and external front end system 103 has caused user device 300 to display products 422 (Television 1), 424 (Television 2), and 426 (Television 3) that fall within the selected price range. In some embodiments, the products may be displayed in order of a ranking determined by external front end system 103. For example, as discussed in further detail below with reference to FIGS. 5A and 5B, external front end system 103 may identify key product recommendations, remove outlier recommendations, and rank remaining recommendations based on a plurality of factors, such as prices, sales volume, product rating, product reviews, search rank, product type mapping (PTK), product sales rank within price ranges, seller reliability, or any other collectible metric related to a product listing accessible through external front end system 103.

Figure 5A:
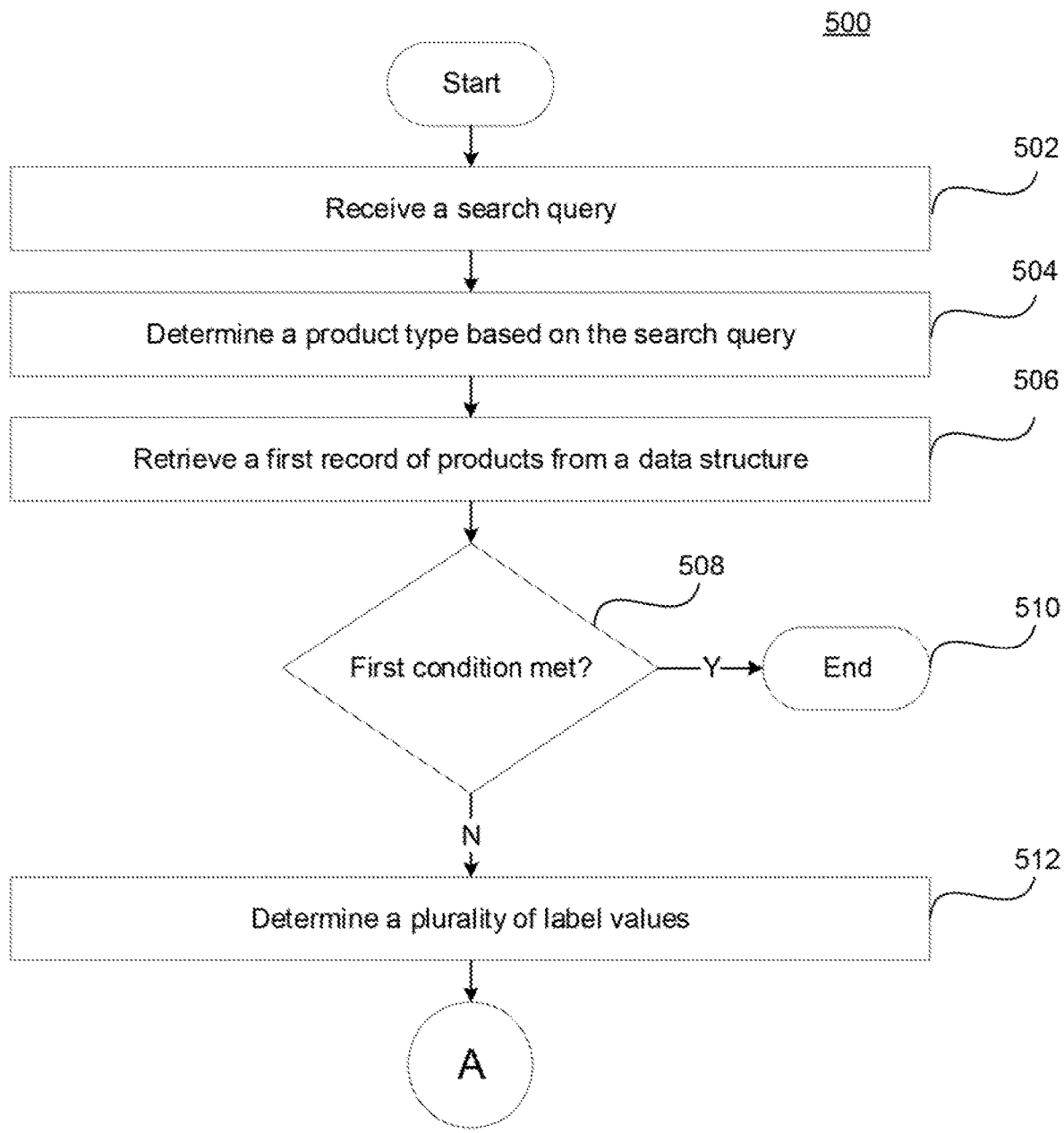
FIGS. 5A and 5B depict a detailed flowchart of an exemplary process for identifying and providing notable product recommendations during online shopping, consistent with disclosed embodiments.
Figure 5B:
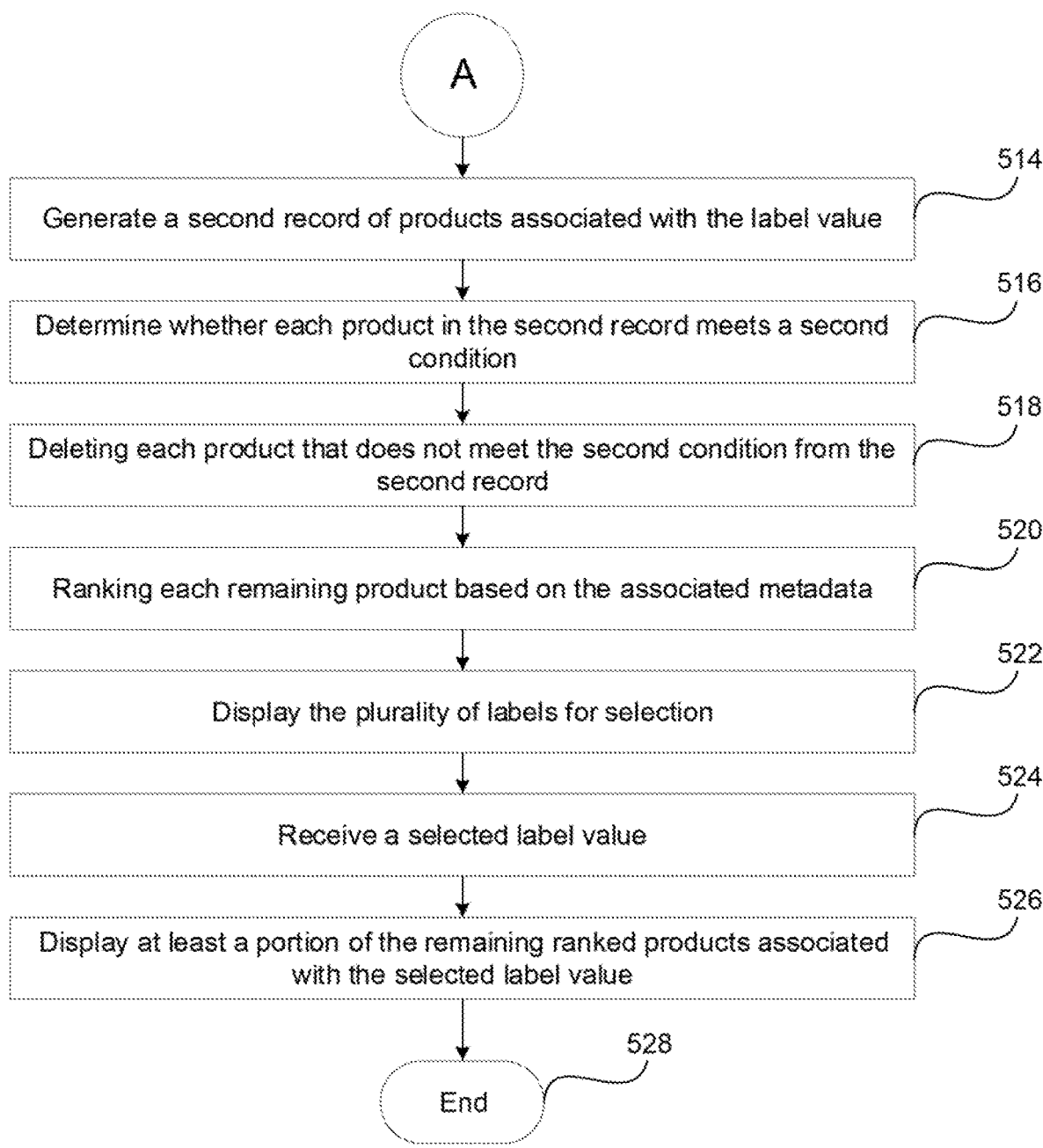

FIGS. 5A and 5B depict a detailed flowchart of exemplary process 500 for identifying and providing notable product recommendations during online shopping, consistent with disclosed embodiments. The process begins at step 502. In step 502, external front end system 103 may receive a search query from user device 300 through, for example, a network associated with system 100. The search query may include at least one keyword or a selection one or more categories of products and/or product types. For example, in FIG. 4, the customer may enter a search query for a laptop by entering 'television' into search bar 402, and user device 300 will transmit the query to external front end system 103.

At step 504, determine, based on the at least on keyword, a product type. The determination of a product type may, for example, be achieved by implementing a search engine (e.g., on external front end system 103), for example, that may produce a relevant set of search results that may fulfill the customer's query. In some embodiments, external front end system 103 may consult an index of product data for a plurality of products contained in at least one data structure (not shown) associated with system 100. For example, each product in the index may include a webpage associated with the product that may be purchased through external front end system. In some embodiments, each the product data for each product may include keywords discovered within the webpage, content contained in the webpage, a freshness of the page (i.e., how recently the page has been updated), user engagement rate of the page, or any other collectible form of data associated with the product. In some embodiments, external front end system 103 may be configured to detect when the associated product data for each product contains the keyword or content related to the keyword and, if so, may include the product in the search results.

External front end system 103 may then rank each product in the listing of products based on their applicability, and/or relativity, to the at least one entered keyword, which may be determined based on any number of factors. For example, in some embodiments, each product in the listing of products may be ranked based on their engagement rates relative to one another, which external front end system 103 may retrieve from at least one data structure (not shown) associated with system 100. An engagement rate may include any number of metrics related to user interaction with the particular product, such as a viewing rate of the product page, a purchase rate of the product, or a comment and/or review rate of the product. In some embodiments, external front end system 103 may also be configured to weigh the engagement rate with other factors, such as customer reviews, seller reliability, or other applicable metrics when ranking the listing of products based on applicability. Other factors that can be used may include a detected language of the search query, a previous search history associated with the user, and a location and/or device type associated with the user device that made the query. In some embodiments, external front end system 103 may input any of the above-described factors or data into an algorithm to rank each product in the listing of products. In some embodiments, external front end system 103 may then determine a product type based at least on the product type of the highest ranked product in the listing of products. However, in some embodiments, the product type may be determined based on one or more of product types associated with products previously purchased under the query, product types of top search results previously returned for the query, product types associated with queries executed by the customer in the same session, any of the factors discussed above, or any other collectible information that may be inserted, accessed, retrieved, and/or modified within a data structure (not shown) associated with system 100.

At step 506, external front end system 103 may retrieve a retrieve a first record comprising products associated with the product type and associated metadata from at least one data structure (not shown) associated with system 100. For example, external front end system may compare the determined product type with the product types of all of the product listings in the data structure, and only retrieve the product listings and associated metadata associated with the product type. The associated metadata may include any amount of data or information associated with each product listing. For example, the metadata may include historical engagement data (i.e., metrics related to user interaction with the particular product, such as a viewing rate of the product page, a sales volume of the product, or a comment and/or review rate of the product, etc.), attributes associated with the product, a product rating, a search rank, a seller reliability rating, or any other collectible information that may be inserted, accessed, retrieved, and/or modified within a data structure (not shown) associated with system 100.

At step 508, in some embodiments, external front end system 103 may determine whether the search query meets a first condition, based on the first record. In some embodiments, the condition may be met if the number of product listings in the first record exceeds a threshold number. For example, external front end system 103 may be configured to only provide recommendations if the search query is sufficiently broad. For example, external front end system may determine that a search query resulting in a number of product listings below a threshold amount (e.g., 30 listings) should not be provided with product recommendations. Thus, the user may not be provided with recommendations when the search is narrow enough to enable the user to make a timely decision themselves on which product to purchase. The threshold number may be fixed, varied based on product type, and/or updated periodically based on historical engagement data related to the user's interaction with the recommendation system.

In some embodiments, external front end system 103 may be configured to determine a plurality of broad queries based on historical query data associated with the product type and/or category, and the first condition in step 508 may be met if the search query matches a determined broad query. For example, external front end system 103 may sort previous queries in historical query data stored in at least one database (not shown) associated with system 100 by their search volume. Based on the search volume, external front end system 103 may designate certain queries as broad queries, for example by picking the queries with the highest search volume (e.g., 10%). Thus, if the received query is one of the designated broad queries, then the search query may meet the first condition.

In some embodiments, external front end system 103 may be configured to determine a number and/or type of attributes in a search query, and the first condition in step 508 may be met based on a number and/or type of attributes specified in the received search query. For example, a search query including the keywords 'brand X 15.6 inch laptop' includes two different attributes (i.e., brand and size). In some embodiments, the first condition may be met if the number of attributes in the query is less than or equal to a certain threshold amount (e.g., zero, one, or two attributes), and/or the first condition may be met if the attributes specified are attributes determined to be broad in nature by external front end system (e.g., a brand of a laptop may be designated as a broad attributes). If the first condition of step 508 is not met, then process 500 may end at step 510.

At step 512, in some embodiments, external front end system 103 may determine a plurality of label values and/or dimensions associated with the product type. In some embodiments, a dimension may include a price, brand, size, or any other attribute related to a product. The dimensions may be categorical (e.g. color, brand, etc.) and/or quantifiable (e.g., price, size, power output, etc.). In some embodiments, the dimensions may be predetermined. For example, the plurality of label values for a certain product type may be preconfigured to correspond to a pricing dimension, such that at least one label value in the plurality of label values is associated with a price range. In some embodiments, each of the at least one label values may correspond to a portion of the entire price range of products associated with the product type. For example, each label value may be associated with a separate quartile price range associated with previously purchased products associated with the product type. In some embodiments, external front end system 103 may be configured to round the boundary numbers of these ranges up or down (e.g., the nearest whole number, nearest tenth number, nearest hundredth number, etc.) based on the price values of the boundary numbers. External front end system 103 may employ similar methods to determine ranges with regard to other values, such as size, weight, volume, power, or any other quantifiable value.

In some embodiments, however, external front end system 103 may be configured to determine the label values and/or dimensions autonomously based on an analysis of the first record of product listings and the associated metadata. For example, external front end system 103 may be configured to collect historical query data in at least one data structure (not shown) associated with system 100. The historical query data may include, for example, a query rate for a plurality of attributes associated with the product type, a query rate for a dimension associated with the product type, or any other collectible metric associated with customer interest in certain attributes or dimensions of a product. External front end system 103 may take the historical query data as an input, and determine which dimension/attributes draw the most interest from customers, and use those dimensions/attributes to define an appropriate label value. For example, in some embodiments, external front end system 103 may determine, for each product in the first record, at least one correlation value associated with at least one of the historical engagement data and the attributes associated with the product, and to determine a dimension associated with each label value based on the at least one correlation value. In some embodiments, however, external front end system 103 may also be configured to take the instant customer's query as an input and determine which dimensions/attributes are appropriate. For example, if customer searches for a 'smart TV,' they should only be shown recommendations relevant to their query. Although a 'smart TV' may be associated with the 'television' product type, external front end system may determine that some label values/dimensions associated with the 'television' product type that are irrelevant to the customer's query, and will only generate label values and dimensions associated with the 'smart TV' attribute.

In some embodiments, at step 514 (FIG. 5B), external front end system 103 may generate, for each label value/dimension, a second record comprising products associated with the label value/dimension based on the associated metadata, and store the second record in at least one data structure (not shown) associated with system 100. As described above, the associated metadata may include any number of attributes that may correspond to a determined label value and/or dimension. For example, external front end system may scrape the metadata associated with each product listing in the first record to determine whether the product listing has an attribute corresponding to the label value and/or dimension, and accordingly include the product listing in the second record. In some embodiments, external front end system 103 may also assess whether a product listing should be included in the second record based on an analysis of signals contained in the metadata, such as sales volume, sales trends, product rating, product reviews count, product search rank for the query, product seller reliability, etc. For example, external front end system 103 may be configured to take any one or more of the above-described signals as an input and execute an algorithm that may weigh the signals to determine whether each product listing should be added to the second record.

In some embodiments, at step 516, external front end system 103 may be configured to determine whether each product listing in the second record meets a second condition, based on the associated metadata. The second condition may be met, for example if at least one signal such as the sales volume, product rating, product reviews count, product search rank for the query, product seller reliability, or any other metric that may be reasonably used to measure the quality/notability of the product, fall below a threshold value. In some embodiments, the second condition may be met based on a comparison of one or more of the above-described signals between each product listing in the second record. For example, a product listing may meet the second condition if one or more of the above-described signals fall below a certain percentile range when compared against other product listings in the second record (e.g., the product review count is in the bottom 10% of review counts for product listings in the second record).

At step 518, if a product listing meets the second condition, external front end system 103 may be configured to delete the product from the second record. In some embodiments, external front end system 103 may achieve this by accessing at least one data structure (not shown) associated with system 100 to modify the second record to delete or otherwise remove the product listing from the record. Thus, external front end system 103 may be configured to ensure quality and relevance of product recommendations by removing outliers based on performance signals.

In some embodiments, at step 520, external front end system 103 may be configured to rank each remaining product listing in each second record of products based on the associated metadata. In some embodiments, this may include sorting the products in a specific order based on signals contained in the metadata, such as sales volume, product rating, product reviews count, product search rank for the query, product seller reliability, etc. that may be weighed by external front end system 103 using any suitable ranking method or algorithm (e.g., Page Rank, Weighted Page Rank, Distance Rank, and EigenRumor algorithms) to determine the order. In some embodiments, external front end system 103 may select a fixed number of the sorted products (e.g., the top 'N' number of products). The fixed number may be included in order to balance giving the customer a sufficient number of options without overwhelming them with too many options. In some embodiments, external front end system 103 will delete all remaining product listings other than the top 'N' number of products from the second record.

In some embodiments, at step 524, external front end system may display the plurality of label values and/or dimensions on user device 300. For example, in FIG. 4, external front end system has determined a plurality of label values and dimensions 412 (<$500), 414 (Smart TVs), and 416 (Brand X) based on the customers query for 'television' in the search bar, consistent with disclosed embodiments. At this time, the user may select one of the label values/dimensions. User device 300 may transmit a selection to external front end system 103 immediately upon clicking, touching on a touch screen, or otherwise selecting a label value and/or dimension. Upon selection of a label value/dimension, user device 300 may transmit the selection to external front end system 103. At step 524, external front end system 103 may receive the transmitted selected label value and/or dimension from user device 300. Additionally, external front end system 103 may be configured to continue to selectably display the unselected label values and/or dimensions. For example, in FIG. 4, the customer has selected dimension 412. However, the customer may still select the unselected label values and/or dimensions 414 and 416 even after selecting dimension 412. This enables the customer to switch label values and/or dimensions to view recommendations instead of a previously selected label value and/or dimension.

In some embodiments, at step 526, external front end system 103 may display at least a portion of the remaining ranked products associated with the selected label value on user device 300. In some embodiments, this may include displaying the top 'N' products in the second record in order from the highest ranked to the lowest ranked. For example, in FIG. 4, user device 300 may display the top ranked products 422 (Television 1), 424 (Television 2), and 426. In some embodiments, external front end system 103 may also cause user device 300 to display recommendation information next to each displayed product. For example, user device 300 may display a review rating of the product, notable attributes of the product, and/or at least one notable customer review of the product. A notable customer review, for example, may be a review that a large number of users has indicated as being helpful.

In some embodiments, the portion of the displayed remaining ranked products corresponds to a fixed number of products (e.g., the top 'N' number of products). However, in some embodiments, the remaining number of ranked products associated with a label value may fall below this fixed number of products after steps 518 and 520. In some embodiments, external front end system 103 may treat the fixed number as a threshold and may determine whether a number of products in the remaining ranked products meets or exceeds the threshold. If the number of remaining products in the second record does not meet or exceed the threshold, external front end system may be configured to display only a highest ranked product. In some embodiments, if only the highest-ranking product of a label value and/or dimension is to be displayed, external front end system may display the highest ranking product in place of the corresponding selectable label value and/or dimension. For example, in FIG. 4, if the amount of product listings associated with label value 414 (Smart TVs) falls below the threshold value, then the highest ranking product listing associated with label value will be displayed in place of label value 414.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for streamlined product searching, the system comprising:
    a memory storing instructions; and
    at least one processor configured to execute the instructions to:
        receive, from a plurality of user devices, user interactions with a plurality of product listings,
        determine an engagement rate associated with each product listing in the plurality of product listings based on the user interactions, wherein the engagement rate corresponds to an amount of use of data associated with each product listing in the plurality of product listings;
        receive, from a first user device, a search query comprising at least one keyword;
        determine, based on the at least one keyword, a product type;
        access, in at least one data structure, an index comprising a plurality of products, each product comprising the associated engagement rate, an associated freshness metric, at least one product type, and associated metadata, wherein the freshness metric is a measure of how recently a corresponding product listing was updated;
        generate, based on consulting the index, a first record comprising each product listing in the plurality of product listings with the determined product type;
        determine, based on the first record, whether the search query meets a first condition on a number of the plurality of product listings in the first record that correspond to the at least one keyword, wherein the first condition is met if the number of the plurality of product listings in the first record exceeds a threshold number; and
        in response to determining that the search query meets the first condition:
        determine, based on the associated metadata of each product listing in the first record, a plurality of label values, wherein each label value in the plurality of label values is associated with a different dimension, and for each label value in the plurality of label values:
            generate, from the first record, a second record comprising each product listing in the first record associated with the label value;
            determine, based on the associated metadata of each product listing in the second record, whether each product listing in the second record meets a second condition of having one or more attributes corresponding to the label value;
            delete each product listing that meets a third condition from the second record, wherein the third condition is met for each product listing in response to determining that two or more of a sales volume, a product rating, a product review count, a search rank, and a seller reliability rating of the corresponding product listing fall below a threshold percentile range relative to other product listings in the second record; and
            determine a rank for each remaining product listing in the second record based on the associated engagement rate of each remaining product listing in the second record;
        display, on an interface of the first user device, the plurality of label values for selection;
        receive, from the first user device, a selected label value; and
        display, on the interface of the first user device, a plurality of graphical user interface (GUI) elements associated with at least a portion of remaining ranked product listings in the second record associated with the selected label value based on the determined ranks of each remaining product listings in the second record, wherein a first GUI element associated with a first product listing among the remaining ranked product listings with the highest engagement rate is displayed on a position closest to a top of the interface of the first user device, and wherein a user input on the first GUI element triggers display of product information associated with the first product listing.

2. The computer-implemented system of claim 1, wherein at least one label value in the plurality of label values is associated with a price range.

3. The computer-implemented system of claim 2, wherein the price range associated with the at least one label value corresponds to a quartile price range associated with previously purchased products associated with the product type.

4. The computer-implemented system of claim 1, wherein the associated metadata comprises, for each product in the index, attributes associated with the product.

5. The computer-implemented system of claim 4, wherein determining a plurality of label value comprises:
    determining, for each product listing in the first record, at least one correlation value associated with historical engagement data and the attributes associated with the corresponding product listing; and determining, based on the at least one correlation value, a dimension associated with each label value.

6. The computer-implemented system of claim 1, wherein the associated metadata comprises, for each product in the index:
a sales volume;
a product rating;
a product review count;
a search rank; and
a seller reliability rating.

7. The computer-implemented system of claim 1, wherein the portion of the remaining ranked product listings corresponds to a fixed number of product listings.

8. The computer-implemented system of claim 7, wherein the processor is further configured to determine whether a number of product listings in the remaining ranked product listings meets or exceeds the fixed number of product listings, and displaying the remaining ranked product listings comprises displaying only a highest ranked product listing if the number of product listings does not meet or exceed the fixed number of product listings.

9. A computer-implemented method for streamlined product searching, the method comprising:
receiving, from a plurality of user devices, user interactions with a plurality of product listings,
determining an engagement rate associated with each product listing in the plurality of product listings based on the user interactions, wherein the engagement rate corresponds to an amount of use of data associated with each product listing in the plurality of product listings;
receiving, from a first user device, a search query comprising at least one keyword;
determining, based on the at least one keyword, a product type;
accessing, in at least one data structure, an index comprising a plurality of products, each product comprising the associated engagement rate, an associated freshness metric, at least one product type, and associated metadata, wherein the freshness metric is a measure of how recently a corresponding product listing was updated;
generating, based on consulting the index, a first record comprising each product listing in the plurality of product listings with the determined product type;
determining, based on the first record, whether the search query meets a first condition on a number of the plurality of product listings in the first record that correspond to the at least one keyword, wherein the first condition is met if the number of the plurality of product listings in the first record exceeds a threshold number; and
in response to determining that the search query meets the first condition:
determining, based on the associated metadata of each product listing in the first record, a plurality of label values, wherein each label value in the plurality of label values is associated with a different dimension, and for each label value in the plurality of label values:
generating, from the first record, a second record comprising each product listing in the first record associated with the label value;
determining, based on the associated metadata of each product listing in the second record, whether each product listing in the second record meets a second condition of having one or more attributes corresponding to the label value;

deleting each product listing that meets a third condition from the second record, wherein the third condition is met for each product listing in response to determining that two or more of a sales volume, a product rating, a product review count, a search rank, and a seller reliability rating of the corresponding product listing fall below a threshold percentile range relative to other product listings in the second record; and
determining a rank for each remaining product listing in the second record based on the associated engagement rate of each remaining product listing in the second record;
displaying, on an interface of the first user device, the plurality of label values for selection;
receiving, from the first user device, a selected label value; and
displaying, on an interface of the first user device, a plurality of graphical user interface (GUI) elements associated with at least a portion of remaining ranked product listings in the second record associated with the selected label value based on the determined ranks of each remaining product listings in the second record, wherein a first GUI element associated with a first product listing among the remaining ranked product listings with the highest engagement rate is displayed on a position closest to a top of the interface of the first user device, and wherein a user input on the first GUI element triggers display of product information associated with the first product listing.

10. The computer-implemented method of claim 9, wherein at least one label value in the plurality of label values is associated with a price range.

11. The computer-implemented method of claim 9, wherein the associated metadata comprises, for each product in the index:
attributes associated with the product.

12. The computer-implemented method of claim 11, wherein determining a plurality of label value comprises:
determining, for each product listing in the first record, at least one correlation value associated with historical engagement data and the attributes associated with the corresponding product listing; and
determining, based on the at least one correlation value, a dimension associated with each label value.

13. The computer-implemented method of claim 9, wherein the associated metadata comprises, for each product in the index:
a sales volume;
a product rating;
a product review count;
a search rank; and
a seller reliability rating.

14. The computer-implemented method of claim 9, wherein the portion of the remaining ranked product listings corresponds to a fixed number of product listings.

15. The computer-implemented method of claim 14, further comprising determining whether a number of product listings in the remaining ranked product listings meets or exceeds the fixed number of product listings, and displaying the remaining ranked product listings comprises displaying only a highest ranked product listing if the number of product listings does not meet or exceed the fixed number of product listings.

16. A computer-implemented system for streamlined product searching, the system comprising:

a memory storing instructions; and
at least one processor configured to execute the instructions to:
- receive, from a plurality of user devices, user interactions with a plurality of product listings,
- determine an engagement rate associated with each product listing in the plurality of product listings based on the user interactions, wherein the engagement rate corresponds to an amount of use of data associated with each product listing in the plurality of product listings;
- receive, from a first user device, a search query comprising at least one keyword;
- determine, based on the at least on keyword, a product type;
- access, in at least one data structure, an index comprising a plurality of product listings, each product listing comprising:
  - a product;
  - the associated engagement rate;
  - an associated freshness metric, wherein the freshness metric is a measure of how recently a corresponding product listing was updated;
  - at least one product type;
  - attributes associated with the product;
- generate, based on consulting the index, a first record comprising each product listing in the plurality of product listings with the determined product type;
- determine whether the search query meets a first condition on the number of the plurality of product listings in the first record that correspond to the at least one keyword, wherein the first condition is met if the number of the plurality of products in the first record exceeds a threshold number; and
- in response to determining that the search query meets the first condition:
  - determine, for each product listing in the first record, at least one correlation value associated with at least one of the product, the at least one product type, historical engagement data, and the attributes associated with the product;
  - determining, based on the at least one correlation value, a plurality of label values, wherein each label value in the plurality of label values is associated with a different dimension, and for each label value in the plurality of label values:
    - generate, from the first record, a second record comprising each product listing in the first record associated with the label value;
    - determine, for each product listing in the second record, whether the corresponding product listing meets a second condition based on at least one of the product, the at least one product type, the attributes associated with each product, and the historical engagement data, wherein the second condition is met when the attributes correspond to the label value;
    - delete each product listing in the second record that meets a third condition from the second record, wherein the third condition is met for each product listing in response to determining that two or more of a sales volume, a product rating, a product review count, a search rank, and a seller reliability rating of the corresponding product listing fall below a threshold percentile range relative to other product listings in the second record; and
    - determine a rank for each remaining product listing in the second record based on at least one of the product, the associated engagement rate, the at least one product type, and the attributes of each remaining product listing in the second record;
  - display, on an interface of the first user device, the plurality of label values for selection;
  - receive, from the first user device, a selected label value; and
  - display, on the interface of the first user device, at least a portion of remaining product listings associated with the selected label value based on the determined ranks of each remaining product listing, wherein a graphical user interface (GUI) element associated with a first product listing among the remaining product listings in the second record with the highest engagement rate is displayed on a position closest to a top of the interface of the first user device, and wherein a user input on the GUI element triggers display of product information associated with the first product listing.

* * * * *